United States Patent
Sinnaduray

(10) Patent No.: US 9,867,190 B1
(45) Date of Patent: Jan. 9, 2018

(54) SYSTEM AND METHOD FOR SIGNAL BOOST IN AN LTE NETWORK

(71) Applicant: Verizon Patent and Licensing Inc., Basking Ridge, NJ (US)

(72) Inventor: David Sanjiv Sinnaduray, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/455,068

(22) Filed: Mar. 9, 2017

(51) Int. Cl.
- *H04B 7/00* (2006.01)
- *H04W 72/04* (2009.01)
- *H04W 74/08* (2009.01)
- *H04W 52/28* (2009.01)
- *H04B 17/318* (2015.01)
- *H04W 52/14* (2009.01)
- *H04W 52/22* (2009.01)
- *H04W 56/00* (2009.01)
- *H04W 64/00* (2009.01)

(52) U.S. Cl.
CPC ...... *H04W 72/0453* (2013.01); *H04B 17/318* (2015.01); *H04W 52/143* (2013.01); *H04W 52/228* (2013.01); *H04W 52/283* (2013.01); *H04W 56/0005* (2013.01); *H04W 64/00* (2013.01); *H04W 74/0833* (2013.01)

(58) Field of Classification Search
CPC ........... H04W 56/0045; H04W 56/005; H04W 52/10; H04W 52/04; H04W 74/0833; H04W 52/283; H04W 52/143; H04W 52/228; H04W 64/00; H04B 17/318

USPC ........ 455/522, 67.11, 68–70, 115.3; 370/318
See application file for complete search history.

(56) References Cited

U.S. PATENT DOCUMENTS

| | | | | |
|---|---|---|---|---|
| 5,430,760 A * | 7/1995 | Dent | ..................... | H04J 13/004 375/141 |
| 6,553,012 B1 * | 4/2003 | Katz | ................... | H04B 7/0491 342/373 |
| 2006/0234737 A1 * | 10/2006 | Neumann | ................. | H03J 7/02 455/502 |
| 2010/0041428 A1 * | 2/2010 | Chen | ..................... | H04W 52/16 455/522 |
| 2014/0064247 A1 * | 3/2014 | Teyeb | ............... | H04W 36/0083 370/331 |
| 2014/0092880 A1 * | 4/2014 | Wang | .................... | H04L 5/0007 370/336 |
| 2014/0153517 A1 * | 6/2014 | Chen | ................. | H04W 74/0833 370/329 |
| 2014/0241237 A1 * | 8/2014 | Speight | ................. | H04W 52/46 370/315 |
| 2015/0257144 A1 * | 9/2015 | Hooli | ................ | H04W 72/0406 370/329 |

(Continued)

*Primary Examiner* — Dominic Rego

(57) ABSTRACT

A method for improving LTE connectivity in known trouble areas is disclosed. The method includes receiving, at an eNodeB, a communication message from a mobile device and determining a first timing advance (TA) information associated with the communication message received from the mobile device. Based on the first TA information it is determined if the mobile device is located in an area susceptible to a communication failure. Upon determining that the mobile device is located in the area susceptible to the communication failure, messages are temporality transmitted from the eNodeB to the mobile device at an increased power level.

19 Claims, 6 Drawing Sheets

(56) References Cited

U.S. PATENT DOCUMENTS

2016/0183323 A1\* 6/2016 Rahman ............ H04W 74/0833
370/329
2016/0198496 A1\* 7/2016 Jeong ...................... H04L 5/001
370/329

\* cited by examiner

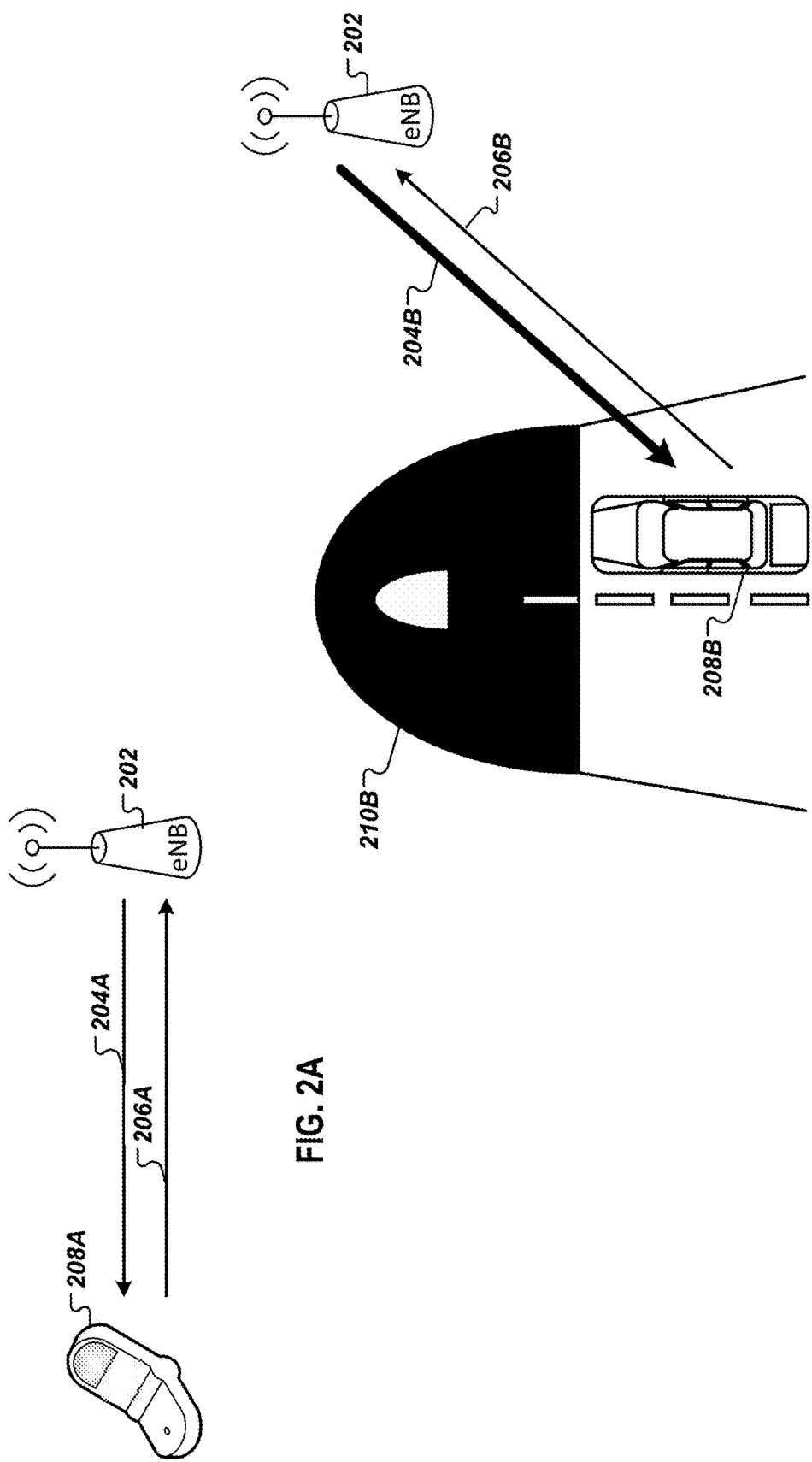

SYSTEM AND METHOD FOR SIGNAL BOOST IN AN LTE NETWORK

BACKGROUND

Due to terrain, both manmade and natural, there are areas where mobile user equipment (UE) consistently lose signaling, either call or data session. The normal way to compensate for this is to increase power on eNodeB (eNB) or to build additional cell sites. Raising of power on eNBs raises the noise floor. The noise floor is the measure of the sum of all the noise sources and unwanted signals, where the noise is any signal other than the one being monitored. Raising the noise floor has the unwanted side effect of creating interference with a signaling system, where the signal to be monitored is hindered or undetected. Additionally building more cell sites is expensive and may result in a similar raising of the noise floor by introducing more noise. Due to the identified limitations, there is a need for improved communication between the UE and the eNB in localities susceptible to communication failure.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A illustrates normal conditions of LTE signal in a mobile network system.

FIG. 2B illustrates unidirectional boost conditions of LTE signal in a mobile network system.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In a signaling system, such as Long Term Evolution (LTE), timing advance is a mechanism utilized for signal synchronization at the eNodeB (eNB). The timing advance is determined by the eNB based on an exchange of control messages between the eNB and the user equipment (UE). Once the timing advance is determined by the eNB, the eNB propagates that value to the UE, which in turn uses that value to offset the timing of signaling from the UE to the eNB. Timing advance is directly proportional to distance between the UE and the eNB, so UEs farther from the eNB will have larger timing advance values compared to closer UEs, which would have smaller timing advance values. The timing advance changes with distance from the eNB to compensate for signal propagation delay.

Figure 1:
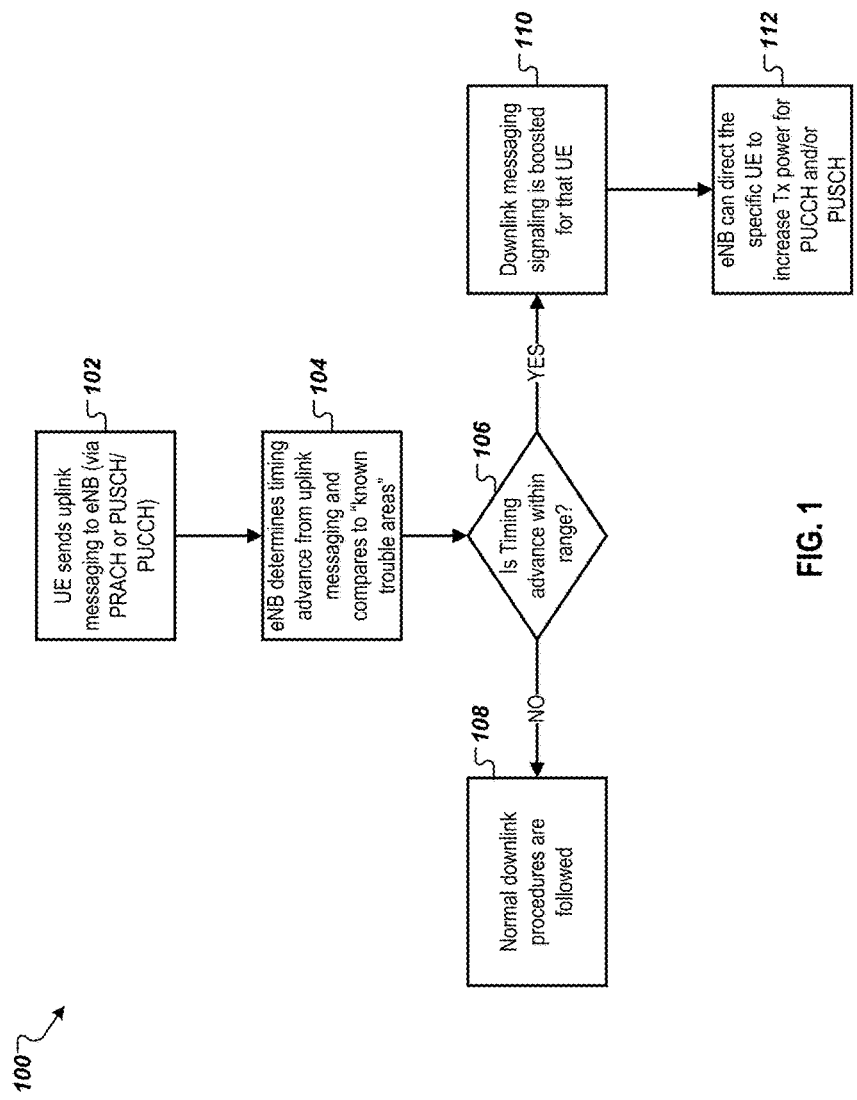
FIG. 1 illustrates a flow chart indicative of the process of boosting a Long Term Evolution (LTE) signal in a mobile network system.

In one embodiment, an eNB may dynamically increase its transmission power utilizing the timing advance feature of LTE and the determination of known signal propagation trouble spots, while instructing the UE to increase its transmission power as well, until the UE is no longer in a known signal propagation trouble spot. Additionally, the eNB may utilize Reference Signal Received Power (RSRP) to detect signal degradation in a connection between the eNB and a UE. Used in conjunction with the timing advance, the eNB may be able to more accurately target affected UEs and boost signals FIG. 1 illustrates an exemplary process 100 for boosting a LTE signal of a mobile device in a known trouble area. The process 100 may begin with a UE sending uplink messaging to an eNB (Step 102). Uplink messaging may include message for initial session setup. The uplink messaging may also include control plane or user plane messages that facilitate sessions and maintain connections between the eNB and UE. Examples of uplink messaging may include a Physical Random Access Channel (PRACH) message on initial connection setup or a Physical Uplink Shared Channel (PUSCH) or Physical Uplink Control Channel (PUCCH) during a session.

Upon receiving the uplink messaging, the eNB determines timing advance from uplink messaging and compares the timing advance to known trouble area (Step 104). The timing advance may be determined from the Random Access Preamble included in the PRACH, PUCCH, or PUSCH messages. Periodically, the UE provides estimates of the timing advance information to the eNB. Based on the messaging feedback during the session, the eNB may utilize eNB determined metrics in conjunction with the UE estimates and provide updated timing advance information back to the UE in a Random Access Response (RAR) message. The UE synchronizes its subsequent messaging based on the timing advance provided to it by the eNB.

Timing advance information may be directly proportional to distance from the eNB in omni-directional antenna or panel antennae deployments for the eNB. An omnidirectional antenna radiates radio wave power uniformly in all directions in one plane. Omnidirectional antennas are used in broadcasting where uniform azimuth coverage is required. A panel antenna includes a dipole placed ahead of a flat-panel reflector. The panel antenna may be used for longer links than the omnidirectional antenna. An area at a specific distance from the eNB will have a corresponding timing advance value, where that timing advance value describes the distance in any direction from the omnidirectional antenna or panel antenna of the eNB. The distance may take the form as the radius of a circle with the eNB's location as the origin of the circle.

The eNB may additionally determine whether the timing advance is within a range of known trouble areas. Known trouble areas are geographic locations identified that have signal propagation problems. Since some trouble spots are large, a single scalar value will not suffice to adequately describe the area in terms of a timing advance value, so a range may be necessary. A range may be determined utilizing two different timing advance values, corresponding to two different distances radiating from the eNB. The resulting affected area contained within the range would be toroidal with the eNB located at the center of the toroid. Network engineers may determine trouble areas by logging known areas with features that cause connectivity issues by obtaining the latitude and longitude values of those areas. The latitude and longitude of the known trouble areas may then be compared against the latitude and longitude values of the affected eNB. The comparison may include triangulation from the affected eNB to the known trouble area. The comparison may be used to determine a distance between the known trouble area and the affected eNB. Additionally, other network eNBs may be affected by this known trouble area, and therefore, there may be multiple timing advance values corresponding to a singular known trouble area in a given network. The determination of which timing advance value is applicable to a UE depends on the eNB with which the UE is currently connected. In an embodiment, the timing advance values may be manually calculated and input into a network database. In another embodiment, the eNB may autonomously determine the timing advance values corresponding to known trouble areas by analyzing network traffic.

The eNB utilizes the timing advance information obtained from the LTE messaging and compares timing advance information obtained from the LTE messaging with timing advance value corresponding to the known trouble area. The comparison may include a lookup in the network attached database for the known trouble areas. The network attached database may be implemented in many forms including but not limited to a relational database, a memory resident data structure or flat configuration file.

The eNB determines whether the timing advance is within a range of the timing advance value corresponding to the known trouble area (Step 106). Alternatively, the determination may include a test for equality, for small known trouble areas. Otherwise the range may be used for the determination, particularly if the known trouble area is geographically large.

If the determination is negative (Step 106, No), normal downlink procedures are followed (Step 108). Normal downlink procedures may include transmitting at LTE specified transmission power levels. Alternatively, normal downlink procedures may include transmitting at carrier specified default transmission power levels. Normal downlink procedures may define the behavior of a UE prior to entering a known trouble area, or upon exiting a known trouble area.

Upon a determination that the UE is not in a known trouble area, the eNB and UE communicate without the need for enhancing the signaling power between the eNB and the UE. By not utilizing a power modification, the network prevents the problem of a rising noise floor.

If the determination is positive (Step 106, Yes), downlink message signaling is boosted for that UE as demonstrated in block 110. The power boost may come in the form of a full frequency spectrum boost, or a more targeted per frequency boost. A full frequency spectrum boost may include raising the broadcast power for all of the frequencies the eNB is capable of transmitting. A more targeted per frequency boost, in contrast, increases the broadcast power of single or a set of frequencies which could be applied specifically for the downlink resources granted to the target UE. The decision for determining a targeted per frequency boost may be based on factors affecting the eNB including signal interference, network deployment models, as well as the capabilities of the eNB. Additionally, if the eNB is at full power but not across the full frequency spectrum, the eNB may increase the power over the available frequencies. In another embodiment, the frequency boost may include boosting the power for either or both the user plane data and the control plane data as the situation warrants to maintain the session. In this embodiment, the eNB may notify the UE, through control messaging, a downlink frequency available for power boosting, so that the UE can anticipate session data reception on the available downlink frequency subject to power enhancement.

Further, an eNB can direct the specific UE to increase transmit power for PUCCH and/or PUSCH (Step 112). As the downlink message signaling may be already boosted, the eNB can further improve the session connection by instructing the UE to increase its uplink message signaling power. In known trouble spots, signaling to the UE via Physical Downlink Control Channel (PDCCH) messages to set the uplink transmit power to the maximum ability of the UE may be advantageous.

LTE provides a mechanism for signal scaling in the form of Reference Signal Received Power (RSRP) messaging. While under normal circumstances, the RSRP is utilized by the eNB to scale power across connected UEs. In one implementation, the eNB may use the RSRP messaging in combination with the timing advance determination to provide a more precise targeting of the affected UEs in the known trouble spot. As the timing advance is directly proportional to the distance between the UE and the eNB, the timing advance value stays constant in a radial path around the eNB. On this arc, there may be some areas with known trouble areas and areas with no known trouble areas.

Utilizing the RSRP by monitoring the signal strength presented by the UE, the eNB may determine signaling issues along the arc that correspond to known trouble areas. By correlating the signal strength presented by the UE against historical signal strength presented by the UE, the eNB may determine if the signal strength is dissipating, which may be indicative of a known trouble area. The eNB may determine the relationship to be binary in nature, meaning a binary comparator including greater than and less than relationships to be the basis of the result. Alternatively delta values for threshold could be utilized to provide a buffered approach to entering and exiting known trouble areas and to compensate for statistical outlying measurements. This allows for the boosting of the transmit power, downlink and possibly uplink, to only the UEs with detected fading RSRP within the timing advance range of the known trouble area. UE connections which do not meet these combinations of elements may have transmit powers that are unaffected.

Alternatively, in a self-optimizing network (SON), the eNB may be able to deduce the timing advance values corresponding to a known trouble area without the manual determination of timing advance values corresponding to latitude and longitude coordinates collected by a network engineer. The SON may utilize aggregate connection data across many UEs to determine known trouble areas. The data may include but not be limited to abnormal connection terminations, low signal values in the RSRP messaging, or a combination. In one implementation, a subset of UEs connected to an eNB may drop connections at a certain timing advance. The SON may store that timing advance information to memory, volatile or non-volatile. The SON may then use that timing advance information to boost downlink transmit power, or alternatively boost downlink transmit power and instruct the UE to boost uplink transmit power, or solely instruct the UE to boost uplink transmit power. Additionally, the SON may utilize RSRP in conjunction with automatically determined timing advance information to further define known trouble areas. Like the previous description, the SON may monitor reported RSRP across all connected UEs. The SON may determine a pattern of signal deterioration from the subset of connected UEs that are experiencing abnormally dropped connections. Symptoms of signal deterioration may include the failure to receive ACKs from the UE as expected, receiving uplink signaling at unexpected times, or not receiving uplink signaling at all. The pattern of signal deterioration may be stored in memory, volatile or non-volatile, for use in comparing against UEs in or approaching timing advance values corresponding to known trouble areas. The eNB of the SON, could then automatically boost the power of only the UEs in the timing advance range with deteriorating signals.

Additionally, when control plane messages are transmitted from the eNB to the UE, the eNB may expect an acknowledgement (ACK) in response. If not enough ACKs are received, the known trouble area may be further identified in combination with the timing advance and the RSRP detection.

FIG. 2A illustrates normal conditions of LTE signal in a mobile network system. UE 208A may be a mobile computing device capable of connecting to an LTE network including but not limited cellular telephone, smart phone, wearable, IoT device, telematics device, tablet laptop, or any other computing device with a wireless transceiver. eNB 202 provides the LTE infrastructure to provide wireless connectivity to the UE 208A. From the eNB 202 to the UE 208A, a downlink 204A may be established. Additionally between the UE 208A to the eNB 202, an uplink 206A may be established. The power used to establish the downlink 204A and the uplink 206A are determined by the LTE specification or network operator preferences. This is an example of normal or typical UE and eNB connections in an LTE network. The relationship between the UE and eNB may be characterized by FIG. 1 Step 108.

FIG. 2B illustrates unidirectional boost conditions of LTE signal in a mobile network system. The UE 208B is exemplified as a mobile device operated as part of or inside an automobile. The UE 208B is wirelessly connected to eNB 202 while the automobile and the UE 208B are approaching a known trouble area 210B, represented as a tunnel. Known trouble areas may include but are not limited to natural geographic phenomena like hills and mountains, but also manmade terrain including tunnels, bridges, and dense urban areas. Generally known trouble areas are those where the communication between a UE and eNB consistently deteriorates. As the UE 208B approaches the known trouble area 210B, the eNB 202 determines that the timing advance between the UE 208B and the eNB 202 is within the range of the known trouble area 210B, and boosts the downlink 204B signal between the UE 208B and the eNB 202 as described in FIG. 1 at Step 110. In this embodiment, the uplink 206B power remains unaffected.

Figure 2C:
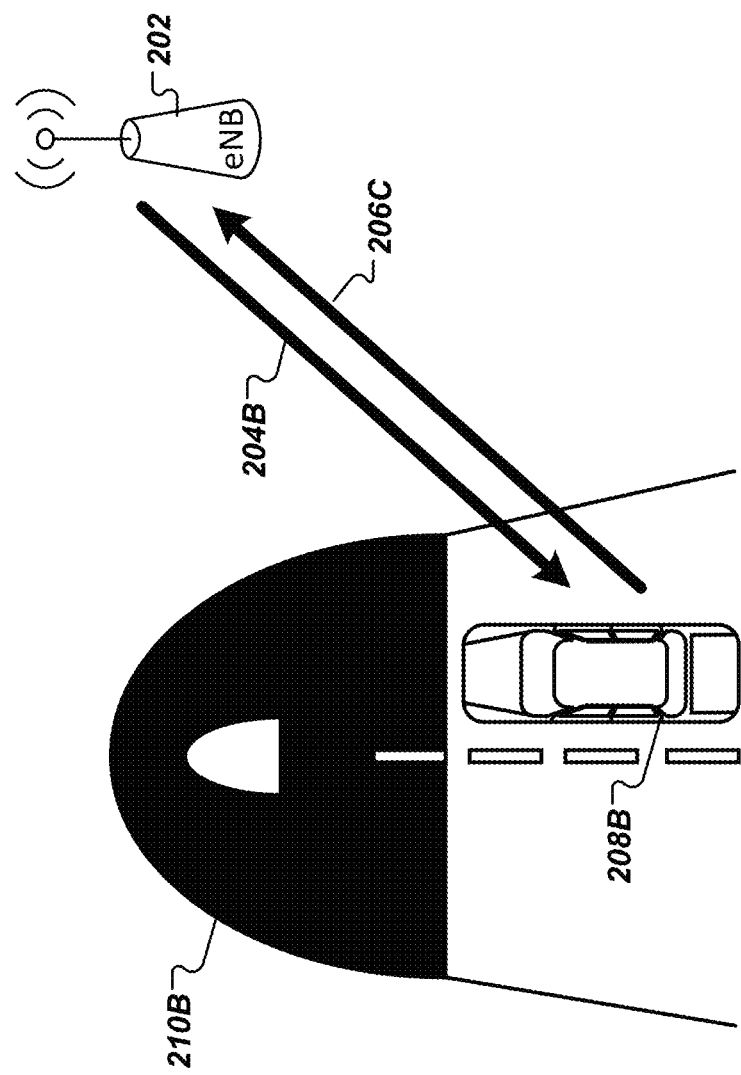
FIG. 2C illustrates bidirectional boost conditions of LTE signal in a mobile network system.

FIG. 2C is an alternative embodiment of FIG. 2B and illustrates bidirectional boost conditions of LTE signal in a mobile network system. UE 208B is entering a known trouble area 210B. eNB 202 detects the approach to the known trouble area 210B based on the timing advance between the eNB 202 and the UE 208B. The eNB 202 boosts the downlink 204B as described in FIG. 1 at Step 110. The eNB 202 also instructs the UE to boost the uplink 206C similarly as Step 112 in FIG. 1.

Figure 3:
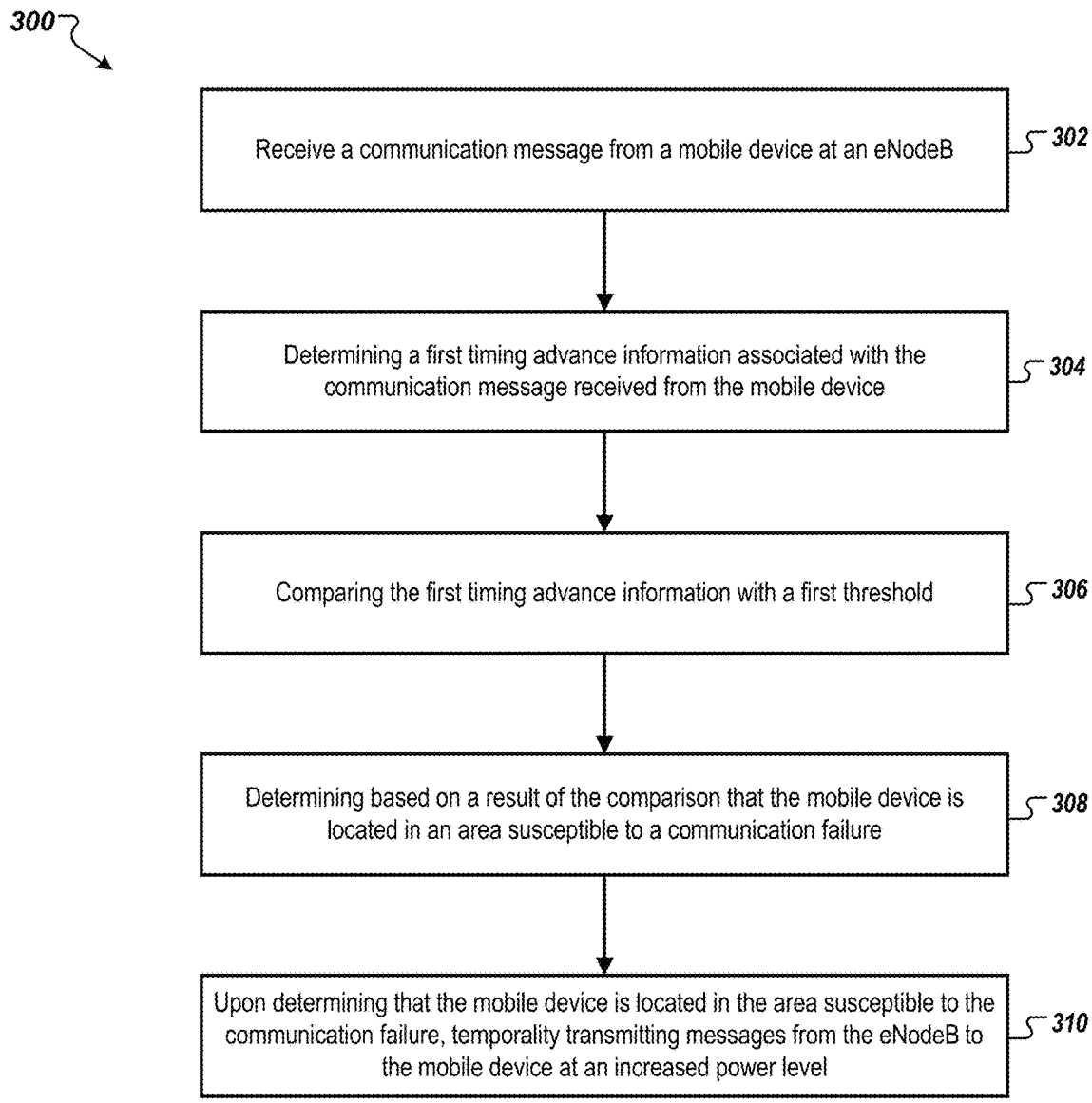
FIG. 3 illustrates another exemplary process for boosting LTE signals to an affected mobile device.

FIG. 3 illustrates a flow chart 300 demonstrating the process of boosting LTE signals to an affected mobile device. The flow chart 300 begins with receiving a communication message from a mobile device at an eNB (Step 302). The communication message may include a message for initial session setup. The messaging may also include control plane or user plane messages that facilitate sessions and maintain connections between the eNB and UE. As described above in relation to FIG. 1 Step 102 examples of uplink messaging may include a PRACH message on initial connection setup or a PUSCH or PUCCH during a session.

A first timing advance information is determined to be associated with the communication message received from the mobile device (Step 304). The timing advance may be determined from PRACH, PUCCH, or PUSCH messaging in the form of a Random Access Preamble. The timing advance may be extracted through a protocol analyzer or parser.

The extracted first timing advance information is compared with a first threshold (Step 306). The first threshold may be a scalar value for small known trouble areas or a range of values for larger known trouble areas. The comparison may include determining if the timing advance information is inclusive to the first threshold. Alternatively, the determining may include evaluating a delta relationship between the first threshold and the timing advance information.

The result of the comparison is that the mobile device is located in an area susceptible to communication failure is determined (Step 308). The result may be a Boolean result indicative of whether the timing advance information is inclusive to the first threshold, wherein a true result indicates the timing advance information is determined to be within the first threshold. A false result may indicate that the timing advance information is determined to be outside of the first threshold.

Upon determining that the mobile device is located in the area susceptible to the communication failure, the eNB temporality transmits messages to the mobile device at an increased power level (Step 310). As described above, the eNB temporarily transmits to the mobile device at an increase power level based on the result. As the increased power level is temporary, the power level may return to typical power levels when the mobile device's timing advance information is no longer within the range of the threshold, the call or session ends normally, or the call or session ends abnormally.

Figure 4:
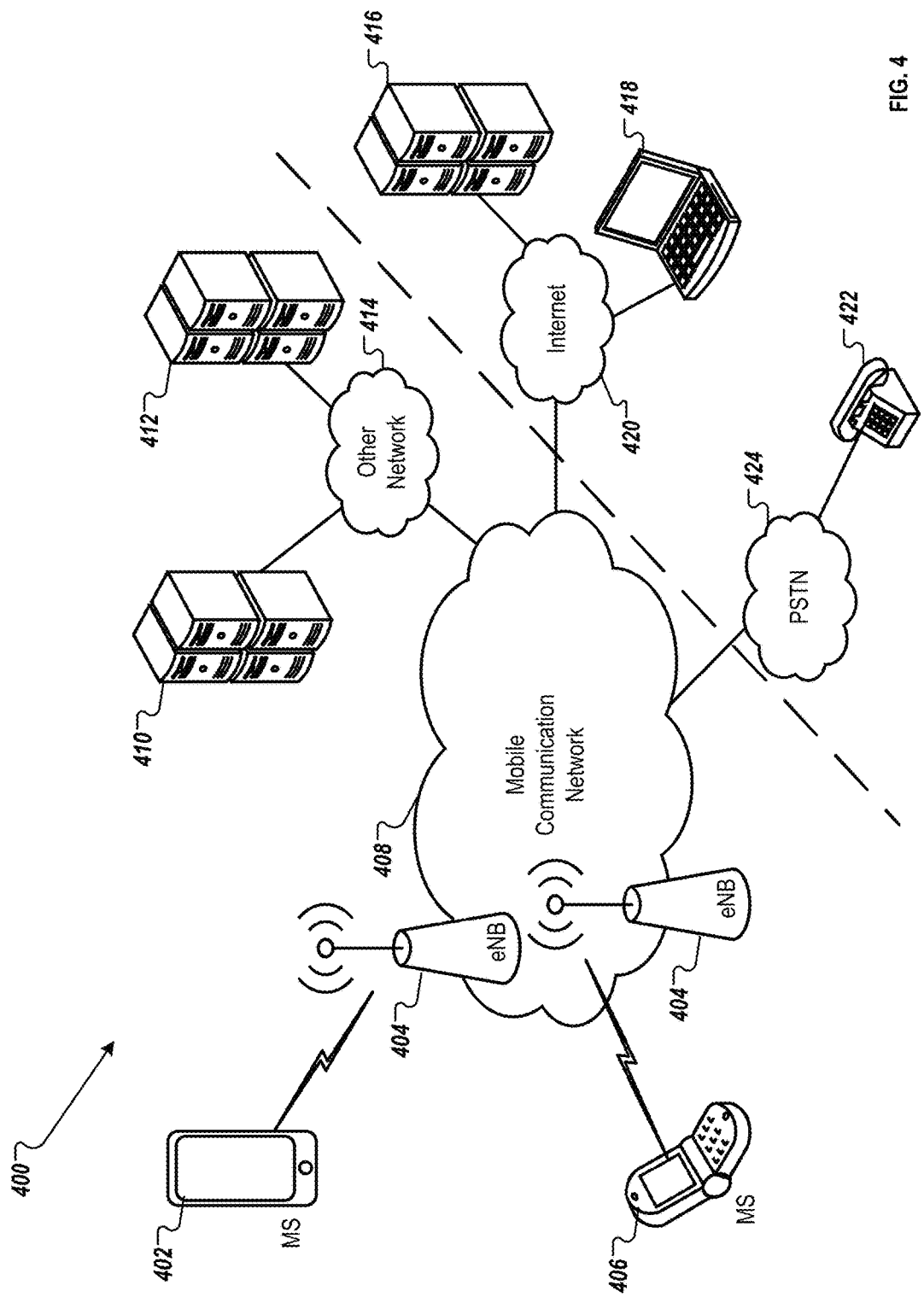
FIG. 4 illustrates a high-level functional block diagram of an exemplary system of networks/devices that provide various communications for mobile stations.

FIG. 4 illustrates an exemplary system 400 offering a variety of mobile communication services in a mobile network where LTE signals may be boosted. The example of FIG. 4 shows two mobile stations (MSs) 402, 406 as well as a mobile communication network 408. Mobile stations 402,406 may also be interpreted as mobile devices or UEs. The network 408 provides mobile wireless communications services to those stations as well as to other mobile stations (not shown), for example, via a number of eNB(s) 404. The eNB(s) 404 may be configured to implement the process for boosting LTE signal in a mobile network system for a mobile device (e.g., device 402 or 406) that is located in an area susceptible to a communication failure as described in more details above with respect to FIGS. 1 and 3. The present techniques may be implemented in or used in any of a variety of available mobile networks 408, and the drawing shows only a very simplified example of a few relevant elements of the network 408 for purposes of discussion here.

The wireless mobile communication network 408 might be implemented as a network conforming to the LTE standard, the code division multiple access (CDMA) IS-95 standard, the 3rd Generation Partnership Project 2 (3 GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 402, 406 may be capable of voice telephone communications through the network 408. Alternatively or additionally, the mobile stations 402, 406 may be capable of data communications through the particular type of network 408 (and the users thereof typically will have subscribed to data service through the network).

The network 408 allows users of the mobile stations such as 402, 406 (and other mobile stations not shown) to initiate and receive telephone calls to each other as well as through the public switched telephone network or "PSTN" 424 and telephone stations 422 connected to the PSTN. The network 408 typically offers a variety of data services via the Internet 420, such as downloads, web browsing, email, etc. By way of example, the drawing shows a laptop PC type user terminal 418 as well as a server 416 connected to the Internet 420; and the data services for the mobile stations 402, 406 via the Internet 420 may be with devices like those shown at 416 and 418 as well as with a variety of other types of devices or systems capable of data communications through various interconnected networks.

Mobile stations 402, 406 can take the form of portable handsets, smart-phones or personal digital assistants, although they may be implemented in other form factors. Program applications can be configured to execute on many different types of mobile stations 402, 406. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 400 can be implemented by a number of interconnected networks. Hence, the overall network 400 may include a number of radio access networks (RANs), as well as regional ground networks interconnecting a number of RANs and a wide area network (WAN) interconnecting the regional ground networks to core network elements. A regional portion of the network 400, such as that serving mobile stations 402, 406, can include one or more RANs and a regional circuit and/or packet switched network and associated signaling network facilities.

Physical elements of a RAN operated by one of the mobile service providers or carriers, include a number of base stations represented in the example by the base stations (BSs) 404. Although not separately shown, such a base station 404 can include a base transceiver system (BTS), which can communicate via an antennae system at the site of base station and over the airlink with one or more of the mobile stations 402, 406, when the mobile stations are within range. Base stations 404 may include eNodeBs in a LTE mobile network. Each base station can include a BTS coupled to several antennae mounted on a radio tower within a coverage area often referred to as a "cell." The BTS is the part of the radio network that sends and receives RF signals to/from the mobile stations 402, 406 that are served by the base station 404.

The radio access networks can also include a traffic network represented generally by the cloud at 408, which carries the user communications and data for the mobile stations 402, 406 between the base stations 404 and other elements with or through which the mobile stations communicate. The network can also include other elements that support functionality other than device-to-device media transfer services such as messaging service messages and voice communications. Specific elements of the network 408 for carrying the voice and data traffic and for controlling various aspects of the calls or sessions through the network 408 are omitted here form simplicity. It will be understood that the various network elements can communicate with each other and other aspects of the mobile communications network 400 and other networks (e.g., the public switched telephone network (PSTN) and the Internet) either directly or indirectly.

The carrier will also operate a number of systems that provide ancillary functions in support of the communications services and/or application services provided through the network 400, and those elements communicate with other nodes or elements of the network 400 via one or more private IP type packet data networks 414 (sometimes referred to as an Intranet), i.e., a private networks. Generally, such systems are part of or connected for communication via the private network 414. A person skilled in the art, however, would recognize that systems outside of the private network could serve the same functions as well. Examples of such systems, in this case operated by the network service provider as part of the overall network 400, which communicate through the intranet type network 414, include one or more application servers 410 and a related authentication server 412 for the application service of server 410. As illustrated in FIG. 4, the servers 416 and 410 may communicate with one another over one or more networks.

A mobile station 402, 406 communicates over the air with a base station 404. The mobile station 402, 406 communicates through the traffic network 408 for various voice and data communications, e.g. through the Internet 420 with a server 416 and/or with application servers 410. Services offered by the mobile service carrier may be hosted on a carrier operated application server 410, for communication via the networks 408 and 414. Server such as 416 and 410 may provide any of a variety of common application or service functions in support of or in addition to an application program running on the mobile station 402, 406. For a given service, an application program within the mobile station may be considered as a 'client' and the programming at 416 or 410 may be considered as the 'server' application for the particular service.

To insure that the application service offered by server 410 is available to only authorized devices/users, the provider of the application service also deploys an authentication server 412. The authentication server 412 could be a separate physical server as shown, or authentication server 412 could be implemented as another program module running on the same hardware platform as the server application 412. Essentially, when the server application (server 412 in our example) receives a service request from a client application on a mobile station 402, 406, the server application provides appropriate information to the authentication server 412 to allow server application 412 to authenticate the mobile station 402, 406 as outlined herein. Upon successful authentication, the server 412 informs the server application 410, which in turn provides access to the service via data communication through the various communication elements (e.g. 414, 408 and 404) of the network 400.

As shown by the above discussion, functions relating to voice and data communication may be implemented on computers connected for data communication via the components of a packet data network, as shown in FIG. 4. Although special purpose devices may be used, such devices also may be implemented using one or more hardware platforms intended to represent a general class of data processing device commonly used to run "server" programming so as to implement the functions discussed above, albeit with an appropriate network connection for data communication.

Figure 5:
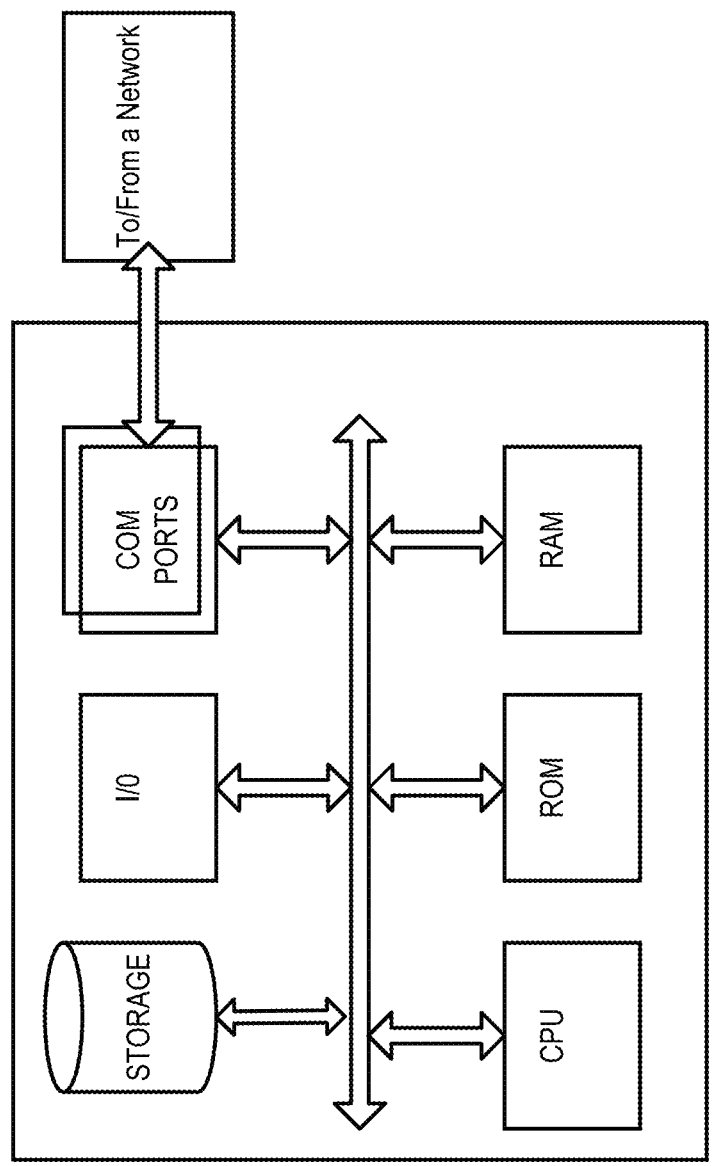
FIG. 5 illustrates a simplified functional block diagram of a personal computer or other work station or terminal device, which may be configured to serve as the processing module of an eNodeB.

FIG. 5 provides functional block diagram illustrations of general purpose computer hardware platform. The computers illustrated in FIG. 5 may correspond to the eNB 202 of FIGS. 2A, 2B, and 2C. FIG. 5 illustrates a network or host computer platform, as may typically be used to implement a server. It is believed that the general structure and general operation of such equipment as shown in FIG. 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the techniques for synchronizing online and offline charging data outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement instructions storing code corresponding to the steps 302-310 of the process 300 of FIG. 3. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at an eNodeB, a communication message from a mobile device;
   determining a first timing advance (TA) information associated with the communication message received from the mobile device;
   determining based on the first TA information if the mobile device is located in an area susceptible to a communication failure; and
   upon determining that the mobile device is located in the area susceptible to the communication failure, temporarily transmitting messages from the eNodeB to the mobile device at an increased power level.

2. The method of claim 1, wherein the communication message includes Physical Random Access Channel (PRACH) control plane messages.

3. The method of claim 1, wherein the communication message includes a Physical Uplink Shared Channel (PUSCH) user plane message.

4. The method of claim 1, wherein determining if the mobile device is located in the area susceptible to the communication failure includes comparing the first TA information with a TA information associated with an area susceptible to communication failure.

5. The method of claim 4, wherein the TA information associated with the area susceptible to the communication failure includes a first range of TA information having a lower limit and an upper limit.

6. The method of claim 4, wherein the TA information associated with the area susceptible to the communication failure is automatically determined by the eNodeB by examining a set of communication failures between the eNodeB and a set of communicatively connected mobile devices, identifying a TA range indicative of the set of communication failures and common to the set of communicatively connected mobile devices, and storing the TA range to a nonvolatile memory as the TA information associated with the area susceptible to the communication failure.

7. The method of claim 1, further comprising:
   receiving Reference Signal Received Power (RSRP) information from the mobile device;
   extracting signal power information from the RSRP information; and
   determining based on the RSRP information that the mobile device is located in the area susceptible to the communication failure,
   wherein temporarily transmitting messages from the eNodeB to the mobile device at the increased power level includes temporarily transmitting messages from the eNodeB to the mobile device at the increased power level based on the RSRP information.

8. The method of claim 1, further comprising upon determining that the mobile device is located in the area susceptible to communication failure, transmitting instructions directing the mobile device to transmit messages to eNodeB at an increased power level.

9. The method of claim 1, wherein the temporality transmitting messages from the eNodeB to the mobile device at an increased power level comprises:
   determining whether the eNodeB is transmitting to the mobile device on a frequency at less than full power that the eNodeB is capable of transmitting;
   responsive to the determining, directing the mobile device to accept transmission at a second frequency; and
   transmitting on the second frequency at full power.

10. The method of claim 1 wherein the communication message comprises a voice call.

11. At least one non-transitory computer readable medium on which are stored instructions comprising instructions that when executed cause a programmable device to:
    receive a communication message from a mobile device at an eNodeB;
    determine a first timing advance (TA) information associated with the communication message received from the mobile device;
    determine based on the first TA information if the mobile device is located in an area susceptible to communication failure; and upon the determination that the mobile device is located in the area susceptible to communication failure, temporarily transmit messages from the eNodeB to the mobile device at an increased power level.

12. The computer readable medium of claim 11, wherein the communication message includes Physical Random Access Channel (PRACH) control plane messages.

13. The computer readable medium of claim 11, wherein:
the instructions further include instructions that when executed cause the programmable device to automatically determine by the eNodeB by examining a set of communication failures between the eNodeB and a set of communicatively connected mobile devices a TA range indicative of the set of communication failures and common to the set of communicatively connected mobile devices, and store the TA range to a nonvolatile memory as a threshold, and
to determine if the mobile device is located in an area susceptible to communication failure, the instructions include instructions that when executed cause the programmable device to determine if the mobile device is located in an area susceptible to communication failure by comparing the first TA information with the threshold.

14. The computer readable medium of claim 11, wherein to determine if the mobile device is located in an area susceptible to communication failure the instructions further include instructions that when executed cause the programmable device to evaluate whether the first TA exists in a first range of threshold indicative of the area susceptible to communication failure.

15. The computer readable medium of claim 11, wherein the instructions further include instructions that when executed cause the programmable device to:
receive Reference Signal Received Power (RSRP) information from the mobile device;
extract signal power information from the RSRP information; and
confirm based on RSRP information that the mobile device is located in the area susceptible to the communication failure,
wherein the instructions to temporarily transmit messages from the eNodeB to the mobile device at the increased power level includes instructions to temporarily transmit messages from the eNodeB to the mobile device at the increased power level based on the RSRP information.

16. The computer readable medium of claim 11, wherein the instructions further include instructions that when executed cause the programmable device to:
upon the determination that the mobile device is located in the area susceptible to communication failure, transmit instructions directing the mobile device to transmit at a third increased power level.

17. A device comprising:
a processor;
a wireless communication module communicatively coupled to the processor;
a memory, communicatively coupled to the processor on which are stored instructions that when executed configure the processor to:
receive a communication message from a mobile device at the wireless communication module;
determine a first timing advance (TA) information associated with the communication message received from the mobile device;
determine based on the first TA information that the mobile device is located in an area susceptible to communication failure; and
upon the determination that the mobile device is located in the area susceptible to communication failure, temporarily transmit messages from the wireless communication module to the mobile device at an increased power level.

18. The device of claim 17, wherein:
the memory further stores instructions that when executed configure the processor to automatically determine by examining a set of communication failures between the eNodeB and a set of communicatively connected mobile devices a TA range indicative of the set of communication failures and common to the set of communicatively connected mobile devices, and store the TA range to a nonvolatile memory as a threshold, and
to determine if the mobile device is located in the area susceptible to communication failure, the memory further stores instructions that when executed configure the processor to determine if the mobile device is located in an area susceptible to communication failure by comparing the first TA information with the threshold.

19. The device of claim 17, the memory further stores instructions that when executed configure the processor to:
receive reference signal received power (RSRP) information from the mobile device;
extract signal power information from the RSRP information; and
confirm based on the RSRP information that the mobile device is located in the area susceptible to the communication failure,
wherein the instructions to temporarily transmit messages from the eNodeB to the mobile device at the increased power level includes instructions to temporarily transmit messages from the eNodeB to the mobile device at the increased power level based on RSRP information.

* * * * *